United States Patent

Van Der Broeck et al.

[11] Patent Number: 6,072,856
[45] Date of Patent: Jun. 6, 2000

[54] POWER SUPPLY UNIT INCLUDING A PULSE WIDTH MODULATED INVERTER, NOTABLY FOR AN X-RAY GENERATOR

[75] Inventors: Heinz Van Der Broeck, Zülpich; Wolfgang Rexhausen, Thomasburg; Bernhard Wagner; Norbert Geerkens, both of Hamburg, all of Germany

[73] Assignee: U.S. Phillips Corporation, New York, N.Y.

[21] Appl. No.: 09/096,197

[22] Filed: Jun. 11, 1998

[30] Foreign Application Priority Data

Jun. 12, 1997 [DE] Germany ............................ 197 24 931

[51] Int. Cl.⁷ ....................................................... H05G 1/10
[52] U.S. Cl. ............................... 378/101; 363/17; 363/71; 363/98; 363/132
[58] Field of Search ...................................... 378/101, 114, 378/115; 363/17, 71, 98, 132

[56] References Cited

U.S. PATENT DOCUMENTS

| 4,259,581 | 3/1981 | Csontos et al. ........................... 378/105 |
| 4,951,185 | 8/1990 | Schutten et al. ........................... 363/17 |
| 5,546,294 | 8/1996 | Schutten et al. ........................... 363/17 |
| 5,719,759 | 2/1998 | Wagner et al. ........................... 363/132 |
| 5,731,968 | 3/1998 | Van Der Broeck et al. .............. 363/71 |
| 5,886,884 | 3/1999 | Baek et al. ................................. 363/48 |

FOREIGN PATENT DOCUMENTS

0756370A2  1/1997  European Pat. Off. ....... H02M 33/37

*Primary Examiner*—David P. Porta
*Assistant Examiner*—Allen C. Ho
*Attorney, Agent, or Firm*—Dwight H. Renfrew

[57] ABSTRACT

The invention relates to a power supply unit which includes an inverter having output connections whereto the primary winding of a transformer is connected via a series capacitor. The rectified secondary voltage of this transformer is applied to a use which requires a high short-time power in a first mode of operation and a lower continuous power in a second mode of operation. The maximum permissible continuous power can be increased by means of an auxiliary inductance Lh which is active in the second mode of operation but inactive in the first mode of operation.

10 Claims, 3 Drawing Sheets

POWER SUPPLY UNIT INCLUDING A PULSE WIDTH MODULATED INVERTER, NOTABLY FOR AN X-RAY GENERATOR

BACKGROUND OF THE INVENTION

1. Field of the Invention

The invention relates to a power supply unit which generates a high short-time power in a first mode of operation and a lower continuous power in a second mode of operation, includes an inverter which is connected to a DC voltage source at the input side and to the output of which there is connected, together with a capacitor, a primary winding of a transformer, a secondary winding of which is coupled to a rectifier arrangement. The invention also relates to the use of such a power supply unit in an X-ray generator as well as to an X-ray system including such an X-ray generator.

2. Description of Related Art

An X-ray generator which includes such a power supply unit is known from the patent application U.S. Pat. No. 5,719,759. The inverter operates with a constant frequency which corresponds to the series resonant frequency which results from the capacitance of the capacitor and the leakage inductance of the transformer. During X-ray exposures (with a high short-time power), the power supply unit operates in the first mode of operation whereas it operates in the second mode of operation during X-ray fluoroscopy (with a low continuous power, i.e. a continuously generated low power). The X-ray exposures can be repeated at given time intervals; the temporal mean value that can be reached is then significantly higher than the continuous power that can be reached in the second mode of operation. This continuous power is limited by the thermal loadability of the transformer and the switching elements used in the inverter.

SUMMARY OF THE INVENTION

It is an object of the present invention to increase the continuous power that can be reached in the second mode of operation. In a power supply unit of the kind set forth this object is achieved in accordance with the invention in that there are provided means for switching over between the first mode of operation and the second mode of operation, a series connection of the primary winding and the capacitor acting on the output of the inverter in the first mode of operation whereas in the second mode of operation this output is subject to a series connection which includes an inductance in series with the primary winding and the capacitor.

The invention is based on the following considerations: in addition to the leakage inductance, a further parasitic effect of the transformer should be taken into account, that is to say the winding capacitance of the secondary side of the transformer. In the first mode of operation, essentially the leakage inductance of the transformer and the capacitance of the capacitor connected in series therewith are the decisive factors in respect of the operating behavior of the power supply unit. The parasitic winding capacitance has an effect for a very short period of time only when it is reversed upon a zero-crossing of the current through the primary winding. Because of the significantly smaller currents in the primary winding of the transformer, the reversal operation is significantly longer in the second mode of operation, so that the series connection of the leakage inductance of the capacitor and the winding capacitance transferred to the primary side have an effect for a longer period of time. Because the winding capacitance transferred to the primary winding is usually much smaller than the capacitance of the capacitor connected in series with the primary winding, the switching operation excites harmonics of the current through the primary winding, which harmonics lead to undesirable current peaks and cause additional losses in the transformer and in the inverter, and hence contribute to a significant deterioration of the efficiency.

The inductance acting in series with the primary winding and the capacitor in the second mode of operation reduces the current through the primary winding. The losses in the switches of the inverter and in the transformer are thus reduced. The inductance limits the maximum possible power transfer, but this fact is insignificant because no more than approximately 5% of the peak power that can be reached in the first mode of operation will be required in the second mode of operation (fluoroscopy). Because said inductance acts only in the second mode of operation, it will not have an effect on the first mode of operation.

Moreover, in the second mode of operation the resonant frequency is reduced by the activation of the inductance (in comparison with a unit without such an inductance), so that the harmonics caused by the switching operation of the inverter are also reduced. This results in a reduction of the reactive power and hence also in a reduction of the losses in the transformer core, in the transformer windings and in the switches of the inverter.

The means for switching over between the two modes of operation can be implemented by a switch arrangement connected parallel to the inductance. The inductance is then short-circuited by the switch arrangement in the first mode of operation so that it is inactive. It is a drawback that the switches provided in the switch arrangement must be designed for the maximum current in the first mode of operation.

In an attractive embodiment, the inverter includes a first and a second inverter branch which are connected in parallel and each of which includes two series-connected switches whose connection points constitute a first and a second output connection of the inverter, respectively; the means for switching over include, connected parallel to the first and the second inverter branch an auxiliary branch which includes two series-connected auxiliary switches; the inductance is included in a branch between the second output connection and the connection point of the two auxiliary switches; and there is provided a control circuit for controlling the switches in the inverter branches and in the auxiliary branch, said control circuit being constructed in such a manner that in the second mode of operation the first inverter branch is deactivated and the auxiliary branch is activated. This embodiment is more attractive because the additional auxiliary switches provided therein (in comparison with the normal inverter design) need conduct only a fraction of the current flowing in the first mode of operation.

It is to be noted that EP-A 0 756 370 already discloses a power supply unit which includes two auxiliary branches, the connection point of each of the auxiliary branches being connected, via a respective inductance, to a respective one of the two output connections of the inverter. These auxiliary branches, however, have a completely different function in comparison with the invention. Via these auxiliary branches, an additional reactive current is applied to the switches of the inverter in the case of low powers; the aim is to enable switching of these switches, with which snubber capacitors are connected in parallel, when the voltage there-across is essentially zero. The invention, however, reduces the current in the load circuit.

The deactivation of the first inverter branch in the second mode of operation according to the solution wherein the inverter includes a first and a second inverter branch which are connected in parallel and each of which includes two series-connected switches whose connection points constitute a first and a second output connection of the inverter, respectively, wherein the means for switching over include, connected parallel to the first and the second inverter branch an auxiliary branch which includes two series-connected auxiliary switches, wherein the inductance is included in a branch between the second output connection and the connection point of the two auxiliary switches, and wherein there is provided a control circuit for controlling the switches in the inverter branches and in the auxiliary branch, said control circuit being constructed in such a manner that in the second mode of operation the first inverter branch is deactivated and the auxiliary branch is activated, however, poses new problems. This is because in the deactivated state of the switches of the first auxiliary branch, the recovery diodes connected parallel to these switches are still active. When the current through the primary winding flows via one of the recovery diodes (and not via the inductance) in the second mode of operation, the effect of the inductance is at least partly suppressed in the second mode of operation.

Therefore, it must be ensured that the current through the recovery diodes is as short as possible in the second mode of operation. This is achieved by means of the following embodiments. In the solution wherein the output connection of the first inverter branch is connected to the connection point of the two auxiliary switches, via the inductance and a further capacitor which is connected in series therewith; the current flow through the recovery diodes is minimized when the capacitance of the further capacitor is suitably chosen, whereas if the control circuit is constructed in such a manner that in the second mode of operation the leading edges of the voltage pulses in the series connection are produced by the closing each time one of the switches of the second inverter branch, any current in the recovery diodes of the first inverter branch is reduced within a very short period of time.

When the first inverter branch is deactivated in the second mode of operation, the parasitic capacitances of the first inverter branch could cause high frequency disturbances (in the MHz range). These disturbances can be eliminated by means of the embodiment wherein a snubber circuit is connected parallel to one of the switches of the first inverter branch.

The first and the second inverter branch are active in the first mode of operation. The auxiliary branch could then be deactivated. However, it is preferably operated so that the control circuit is constructed in such a manner that in the first mode of operation the switches of the auxiliary branch are switched simultaneously with the switches of the first inverter branch, so that the high voltage is not affected and the current in the inductance is approximately zero, because no voltage acts thereacross.

The switch-on current of the first inverter branch can be reduced in the first mode of operation of the embodiment wherein the control circuit is constructed in such a manner that in the first mode of operation the switches of the auxiliary branch are switched in synchronism with but delayed with respect to the switches of the first inverter branch.

An X-ray generator for feeding and X-ray tube is a preferred field of application of the invention. An X-ray generator must be capable of providing on the one hand high short-time powers (for example, 100 kW for several 100 ms) for X-ray exposures and, on the other hand, continuous powers for X-ray fluoroscopy which may amount to several kW when use is made of filters which strongly attenuate the X-rays. Such an X-ray generator may form part of an X-ray system (comprising one or more X-ray examination apparatus, one or more X-ray tubes and at least one image converter).

BRIEF DESCRIPTION OF THE DRAWINGS

The invention will be described in detail hereinafter with reference to the drawings. Therein.

DETAILED DESCRIPTION OF THE PREFERRED EMBODIMENTS

Figure 1:
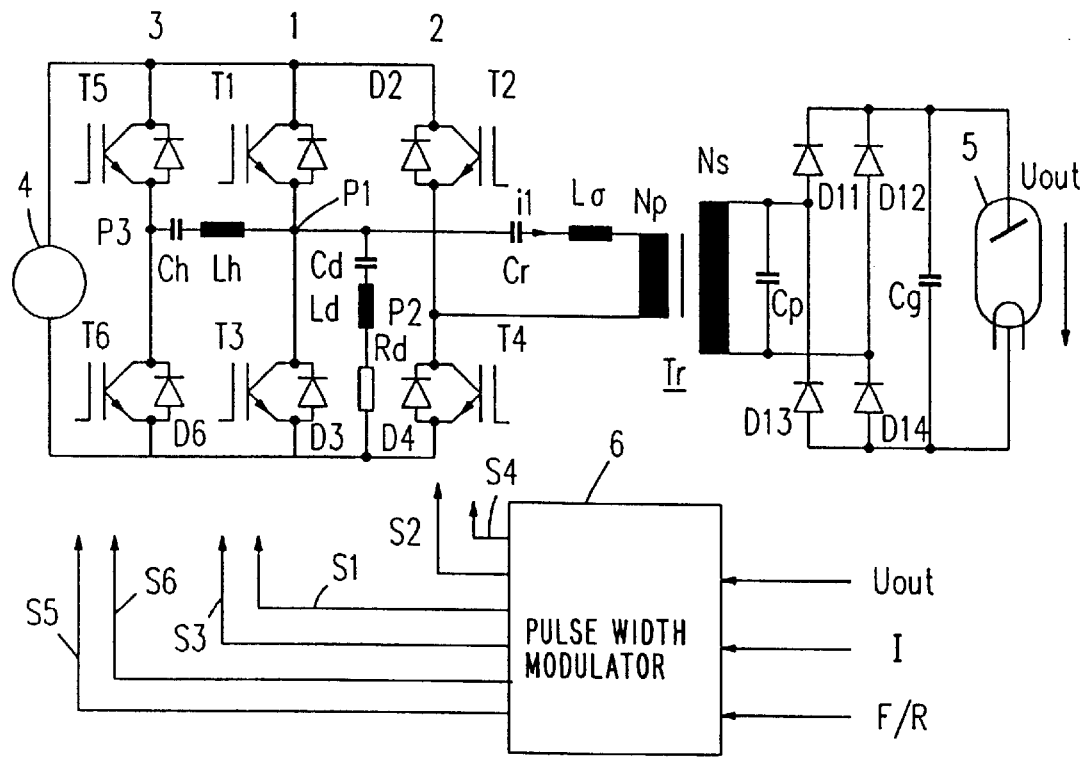
FIG. 1 shows a first embodiment of the invention.

FIG. 1 shows a circuit diagram of the part of an X-ray generator which is of relevance to the invention. The power supply unit of this X-ray generator includes an inverter which has a first inverter branch 1 and a second inverter branch 2. Each inverter branch consists of the series connection of two switches, for example the switching transistors T1, T3 and T2, T4, respectively, with which a so-called recovery diode D1, D3 and D2, D4 is connected in parallel in the reverse forward direction. No snubber capacitors or other relief networks are provided parallel to the switches T1 . . . T4.

The connection point of the switches T1, T3 of the first inverter branch 1 forms a first output connection P1 and the connection point of the switches T2, T4 of the 30 second inverter branch 2 forms a second output connection P2 of the inverter. The two inverter branches are connected in parallel to a DC voltage source 4. The output connections P1, P2 of the inverter are connected to one another via the series connection of a capacitor Cr and the primary winding Np of a transformer Tr whose leakage inductance $L_o$ is also shown. Thus, a series-resonant inverter is concerned.

The capacitance of the capacitor Cr is chosen so that a resonant frequency of, for example 20 kHz is obtained in conjunction with the leakage inductance $L_o$. The switches T1 . . . T4 are driven by switching signals s1 . . . s4 from a programmable pulse width modulator 6 in such a manner that a pulse width modulated square-wave voltage of at least approximately resonant frequency is present between the output connections P1, P2.

The secondary winding of the transformer Tr is denoted by the reference Ns. The parasitic winding capacitance Cp acts parallel thereto. The secondary winding is connected to a rectifier arrangement which includes diodes D11 . . . D14 and one or more smoothing capacitors or capacitances Cg, an X-ray tube 5 being connected to the output of said rectifier arrangement.

The invention as described thus far is known from the cited document.

In accordance with the invention, an auxiliary branch 3 is connected parallel to the inverter branches 1, 2, said auxiliary branch comprising, like the inverter branches 1 and 2, series-connected switches T5 and T6, a respective recovery diode D5, D6 being connected anti-parallel thereto. The semiconductors in the auxiliary branch 3 need only be designed for a small current which only amounts to, for example 10% of the current for which the semiconductors in the inverter branches 1, 2 must be designed. Therefore, the auxiliary branch 3 can be realized at a cost which is substantially lower than that of the inverter branches 1 and 2.

The connection point P3 of the switches T5, T6 in the auxiliary branch 3 is connected to the output connection P1 of the first inverter branch via the series connection of an auxiliary inductance Lh and an auxiliary capacitor Ch. The auxiliary inductance Lh should not be smaller than the leakage inductance $L_o$ of the transformer Tr, but preferably a number of times larger.

A snubber circuit is connected parallel to one of the switches of the inverter branch 1, for example the switch T3, said snubber circuit consisting of the series connection of a resistor Rd, an inductance Ld and a capacitor Cd. Therefore, for alternating current in this inverter branch (via the DC voltage source 4) it is also connected parallel to the other switch (T1).

The switching signals s5 and s6 for the transistors T5 and T6 of the auxiliary branch are also supplied by the pulse width modulator. The variation in time of the switching signals s1 ... s6 is dependent not only on the voltage Uout at the X-ray tube, but also on the desired tube current I and on the fact whether an X-ray exposure (first mode of operation) or X-ray fluoroscopy (second mode of operation) is to be performed. The mode of operation is signalled to the pulse width modulator, for example via the lead F/R. In the first mode of operation essentially only the two inverter branches 1 and 2 are active. The first inverter branch 1 is deactivated in the second mode of operation and only the switches in the inverter branch 2 and in the auxiliary branch 3 are switched; as a result, the auxiliary inductance Lh starts to act in series with the capacitor Cr and the primary winding, so that the loss power in the switches and in the transformer is substantially reduced. This will be described in detail hereinafter with reference to the FIGS. 2 to 4.

Figure 2A:
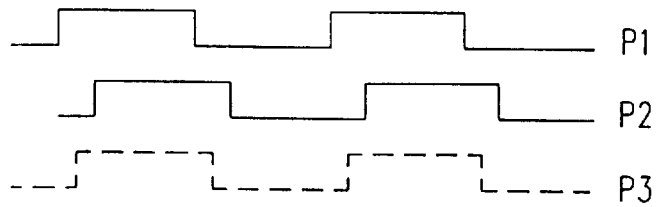
FIG. 2a shows the variation in time of the potential at the output connections of the inverter in the first mode of operation.
Figure 2B:
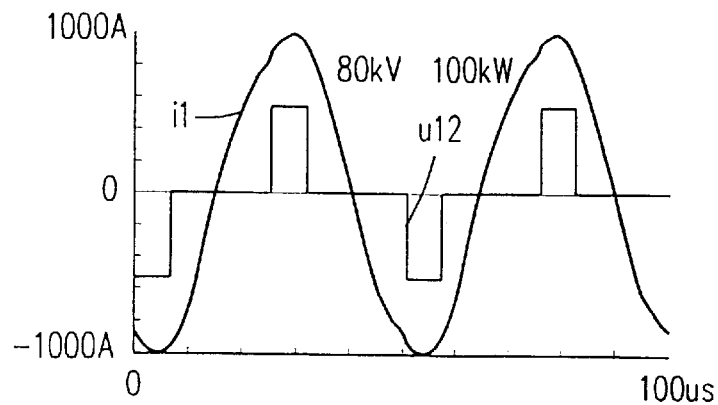
FIG. 2b shows the resultant variations in time of the current and the voltage at the output of the inverter.

FIG. 2a shows the temporal variation of the potentials at the output connections P1 and P2 of the inverter branches as required for the first mode of operation; the third inverter branch may but need not necessarily be deactivated in the first mode of operation. The pulse width modulated voltage, denoted by the reference $U_{12}$ in FIG. 2b, is obtained between the output connections P1 and P2 due to a phase shift of the potential variations of P1 and P2. The pulses will be wider (and the power transferred to the secondary side will be higher) as the phase shift between the output potentials P1 and P2 is greater. The electric power transferred to the secondary side depends on the pulse width in a highly non-linear fashion. The associated current i1 through the primary winding is also shown in FIG. 2b. It appears that this variation is substantially sinusoidal and that the reversing operations (in the case of a jump of the voltage $U_{12}$ to a positive or a negative value) are practically not noticeable. Therefore, this circuit has a suitable efficiency in the first mode of operation.

Figure 3:
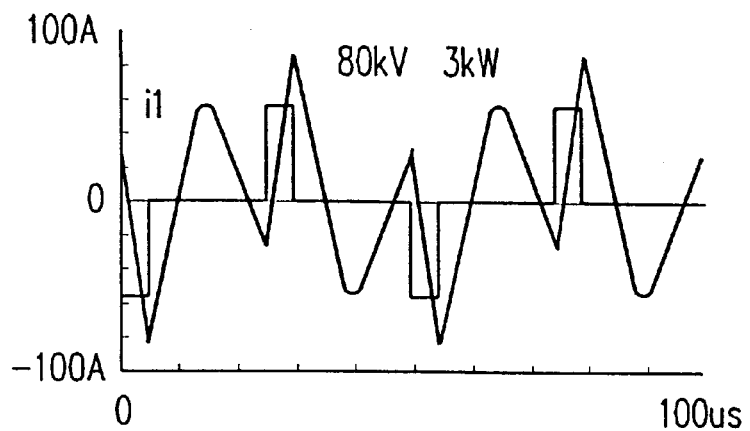
FIG. 3 shows the variations in time of the current and the voltage at the output of the inverter as they would occur for low output powers if the steps according to the invention were not taken.
Figure 4A:
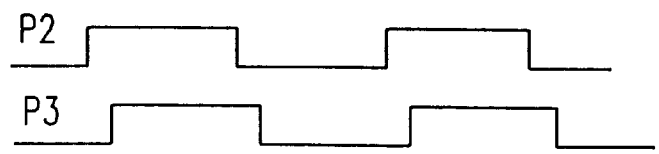
FIG. 4a shows the variation in time of the potential at an output connection of the inverter or at the connection point of the auxiliary branch.
Figure 4B:
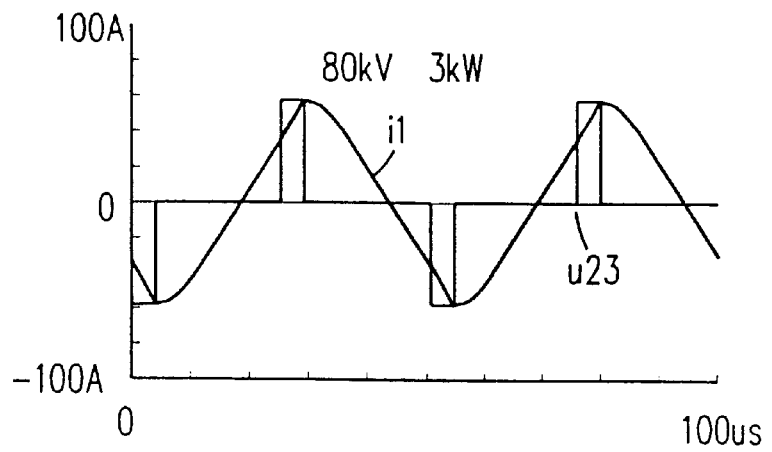
FIG. 4b shows the resultant variations in time of the current and the voltage.

FIG. 3 shows the variation of the current i1 when the output power is reduced from the value underlying FIG. 2b (for example, 100 kW) to a value of, for example 3 kW and when phase shift of P1 and P2 and thus the pulse width is reduced accordingly, without the control of the inverter being modified otherwise. The variation shown in FIG. 3 exhibits comparatively high peaks of the current i1, which is why comparatively large losses occur in the switches and in the transformer winding. Moreover, the current variation deviates significantly from a sinusoidal variation, i.e. the current has a high harmonic content, so that a comparatively strong reactive power component occurs. During continuous operation these two effects lead to heating of the transformer core, the transformer windings and the switching elements of the inverter to such an extent that continuous operation is impossible when using this adjustment or an inverter including only the inverter branches 1 and 2.

In accordance with the invention, a second mode of operation, in which the first inverter branch 1 is deactivated (i.e. the switches T1 and T3 remain blocked during this mode) is imposed via the pulse width modulator 6. The branches 2 and 3 then act as an inverter; however, in addition to the series connection of the capacitor Cr and the primary winding Np, the auxiliary inductance Lh then acts between the outputs P3 and P2 (in series with the capacitor Ch). The additional auxiliary inductance Lh reduces the amplitude of the current i1 on the one hand and the harmonic content of this current on the other hand (FIG. 4b), so that a sine-like current variation occurs, resulking in a reduced reactive power and reduced losses in the switches and in the transformer winding.

Even when the switches T1 and T3 of the first inverter branch are blocked in the second mode of operation, a current can still flow via the recovery diodes D1 or D3 if 10 the potential at the output connection P1 of the first inverter branch becomes more positive than the potential at the positive pole or more negative than the potential at the negative pole of the DC voltage source 4. Such a current flow at least partly deactivates the inductance Lh.

This can be prevented in various ways:
a) After each free wheeling of the voltage between P2 and P3, i.e. upon each voltage transition to a positive or a negative value, first the second inverter branch 2 must be switched over and then the auxiliary branch 3. As a result, any current in one of the recovery diodes D1 or D3 will be eliminated in the shortest possible time.
b) When suitably proportioned, the auxiliary capacitance Ch can minimize the current flow across the recovery diodes. The effect of Lh (reduction of the harmonic content and the current amplitude) is preserved even if the product of the capacitance of Ch and the inductance of Lh has the same value or is even smaller than the product of $L_o$ and the capacitance of the capacitor Cr.

Because the transistors T1 and T3 remain continuously switched off in the second mode of operation, their parasitic capacitances may also have a disturbing effect. They could form a resonant circuit in conjunction with the auxiliary inductance Lh or the leakage inductance $L_o$, which could give rise to high-frequency oscillations which could cause electromagnetic disturbances in given circumstances. These disturbances can be suppressed by the damping member Cd, Ld, Rd. Cd and Ld are in resonance at the interference frequency to be expected, so that they are damped by Rd, whereas on the other hand the reactance of Cd in series with Ld is so high that the damping member practically has no effect on the useful voltage variation at the output connection P1.

In a practical embodiment of an X-ray generator as shown in FIG. 1 the permissible continuous power permissible in the continuous operation mode could be increased by approximately a factor of 4 by using the invention.

As has already been stated, the inverter branches 1 and 2 are active in the first mode of operation, i.e. the switches included therein are periodically opened and closed. The auxiliary branch may then be deactivated. However, the switches included therein are preferably switched in synchronism with the switches of the first inverter branch. In that case no voltage drop occurs across the series connection Lh, Ch, so that no current will flow through these elements which, therefore, will not have an effect. However, as is denoted by dashed lines in FIG. 2a, in the first mode of operation the transistors T5 and T6 of the auxiliary branch can also be switched in such a manner that a lagging, trapezoidal reactive current flows in Lh, said current reducing the switch-on current of the first inverter branch.

Figure 5:
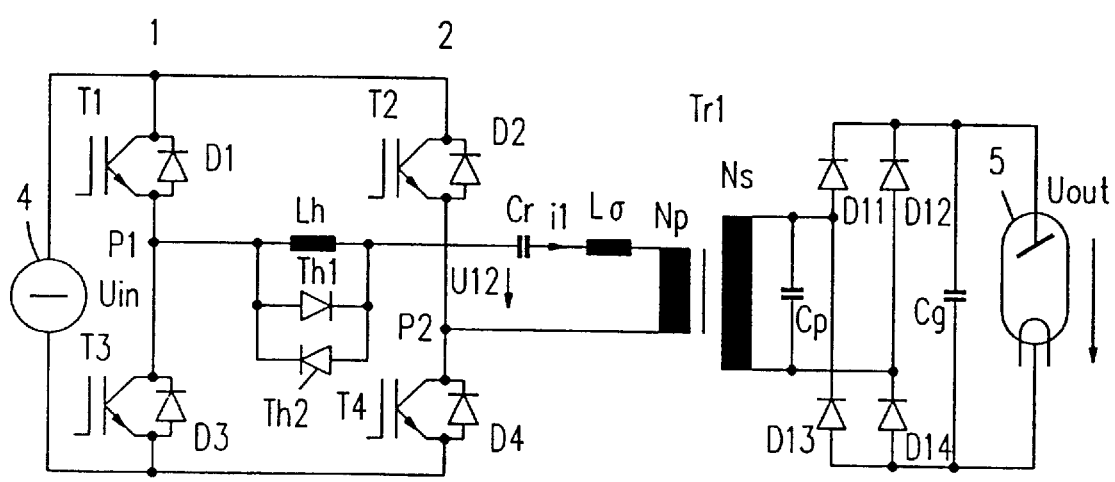
FIG. 5 shows a second embodiment of the invention.

FIG. 5 shows a second embodiment of the invention; the same reference numerals as used in FIG. 1 are used for corresponding components. An auxiliary branch such as that used in FIG. 1 is now absent. Instead an auxiliary inductance Lh is connected between the output connections P1 and P2 of the inverter branches 1 and 2, in series with the capacitor Cr and the primary winding Np, two thyristor switches Th1 and Th2, having an opposed forward direction, being connected parallel to said auxiliary inductance Lh.

In the first mode of operation, one of the two switches is always conductive, so that the auxiliary inductance Lh is short-circuited and no differences in operation occur with respect to the known circuit of the kind set forth. In the second mode of operation the switches Th1 and Th2 are continuously blocked, so that the auxiliary inductance Lh is activated and reduces the amplitude and the harmonic content of the current I1 through the primary winding. The thyristor switches Th1 and Th2 must be able to carry the maximum value of the current I1 in the first mode of operation. However, because they continuously short-circuit the auxiliary inductance Lh in the first mode of operation and are continuously inactive in the second mode of operation, they could be replaced by a mechanical switch which is opened in the first mode of operation and closed in the second mode of operation and is switched over upon changing-over from X-ray exposures to X-ray fluoroscopy.

The invention has been described in conjunction with an X-ray generator in which the power is fed into the primary winding of a high-voltage transformer by an inverter. However, the invention can also be used when the power is fed into a respective primary winding of a common high-voltage transformer by two (or more) inverters, for example as described in U.S. Pat. No. 5,731,968.

The invention has been elucidated in conjunction with an inverter whose power is controlled by pulse width modulation (at constant frequency); however, the invention can also be used for an inverter whose power is controlled by frequency variation. Furthermore, the invention has been explained on the basis of a series-resonant inverter (primary winding and capacitor in series); however, it can also be used for other resonance topologies, for example for a parallel-resonant inverter.

All references cited herein are incorporated herein by reference in their entirety and for all purposes to the same extent as if each individual publication or patent or patent application was specifically and individually indicated to be incorporated by reference in its entirety for all purposes.

What is claimed is:

1. A power supply unit which generates a high short-time power in a first mode of operation and a lower continuous power in a second mode of operation, includes an inverter which is connected to a DC voltage source at the input side and to the output of which there is connected, together with a capacitor, a primary winding of a transformer, a secondary winding of which is coupled to a rectifier arrangement, wherein there are provided means for switching over between the first mode of operation and the second mode of operation, a series connection of the primary winding and the capacitor acting on the output of the inverter in the first mode of operation whereas in the second mode of operation this output is subject to a series connection which includes an inductance in series with the primary winding and the capacitor.

2. A power supply unit as claimed in claim 1, wherein the means for switching over include a switch arrangement connected parallel to the inductance.

3. A power supply unit as claimed in claim 1, wherein the inverter includes a first and a second inverter branch which are connected in parallel and each of which includes two series-connected switches whose connection points constitute a first and a second output connection of the inverter, respectively, wherein the means for switching over include, connected parallel to the first and the second inverter branch an auxiliary branch which includes two series-connected auxiliary switches, wherein the inductance is included in a branch between the second output connection and the connection point of the two auxiliary switches, and wherein there is provided a control circuit for controlling the switches in the inverter branches and in the auxiliary branch, said control circuit being constructed in such a manner that in the second mode of operation the first inverter branch is deactivated and the auxiliary branch is activated.

4. A power supply unit as claimed in claim 3, wherein the output connection of the first inverter branch is connected to the connection point of the two auxiliary switches, via the inductance and a further capacitor which is connected in series therewith.

5. A power supply unit as claimed in claim 3, wherein the control circuit is constructed in such a manner that in the second mode of operation the leading edges of the voltage pulses in the series connection are produced by the closing each time one of the switches of the second inverter branch.

6. A power supply unit as claimed in claim 3, wherein a snubber circuit is connected parallel to one of the switches of the first inverter branch.

7. A power supply unit as claimed in claim 3, wherein the control circuit is constructed in such a manner that in the first mode of operation the switches of the auxiliary branch are switched simultaneously with the switches of the first inverter branch.

8. A power supply unit as claimed in claim 3, wherein the control circuit is constructed in such a manner that in the first mode of operation the switches of the auxiliary branch are switched in synchronism with but delayed with respect to the switches of the first inverter branch.

9. A power supply unit as claimed in claim 1, wherein it is used in an X-ray generator for feeding an X-ray tube.

10. An X-ray system which includes an X-ray generator as claimed in claim 9.

* * * * *